United States Patent [19]

Brown et al.

[11] 4,177,461
[45] Dec. 4, 1979

[54] SMOKE ALARM DEVICE FOR A GRAIN DRYER

[75] Inventors: David A. Brown; Jan L. Norman; Donald W. Whitson, all of Scott City, Kans.

[73] Assignee: All Phase Electronics, Inc., Scott City, Kans.

[21] Appl. No.: 871,372

[22] Filed: Jan. 23, 1978

Related U.S. Application Data

[63] Continuation-in-part of Ser. No. 684,718, May 10, 1976, abandoned.

[51] Int. Cl.² .................................................. G08B 17/10
[52] U.S. Cl. ................................. 340/628; 34/174; 340/693
[58] Field of Search .................. 340/628, 629, 630; 34/174; 432/32

[56] References Cited

U.S. PATENT DOCUMENTS

| 2,185,361 | 1/1940 | Towne | 340/630 X |
| 2,620,385 | 12/1952 | Grant, Jr. | 340/506 |
| 3,636,638 | 1/1972 | Noyes | 34/174 X |

Primary Examiner—John W. Caldwell, Sr.
Assistant Examiner—Daniel Myer
Attorney, Agent, or Firm—Edwin H. Crabtree

[57] ABSTRACT

An alarm device for a grain dryer. The alarm device activating an audio alarm and visual alarm energized electrically by a smoke detector and burner shutdown indicator lamp to warn the dryer operator when a burner is no longer operating or when smoke is detected in the dryer.

9 Claims, 6 Drawing Figures

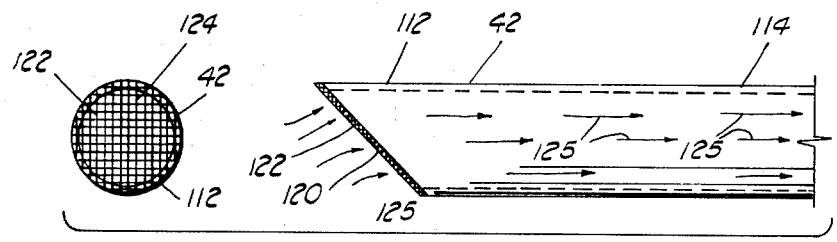
F I G . 5
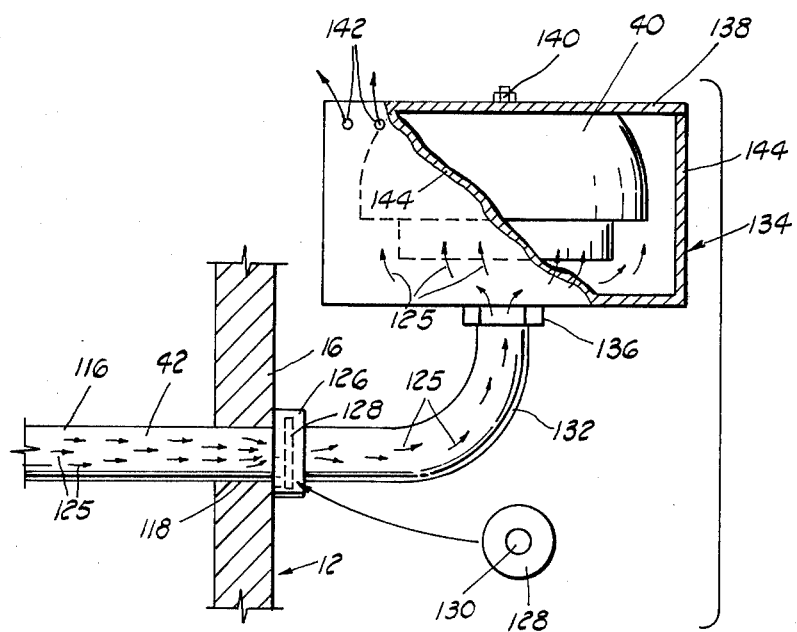
F I G . 6

SMOKE ALARM DEVICE FOR A GRAIN DRYER

CROSS REFERENCE TO RELATED APPLICATIONS

This application for patent is a continuation in part application of our application entitled AN ALARM DEVICE FOR A GRAIN DRYER filed May 10, 1976 and having Ser. No. 684,718, abandoned.

BACKGROUND OF THE INVENTION

This invention relates generally to alarm devices and more particularly, but not by way of limitation, to an audio and visual alarm for indicating a problem in the operating condition of a grain dryer.

Grain dryers are commonly used for drying corn, milo, wheat, or the like to reduce moisture content therein prior to storing the grain in a dry storage bin.

Generally grain dryers include a holding bin mounted in the top of the grain dryer housing for storing the wet grain therein. The wet grain is fed downward past a hot air chamber which has perforations in the sides and top of the chamber. The hot air chamber is heated by a gas fired burner mounted at one end thereof. A heater fan coacts with the burner in circulating the hot air through the hot air chamber, out the perforations therein, and through the grain as it is fed past the hot air chamber. The hot air is then discharged out the sides of the dryer. The grain is heated and dried as it moves past the hot air chamber.

The grain is then fed past a cool air chamber directly below the hot air chamber. The cool air chamber also includes perforations in the sides thereof for circulating cool air from a cooling fan mounted at one end of the cool air chamber. The cool air flows through the perforated sides of the cool air chamber and through the circulating grain thereby cooling the grain prior to being received in the bottom of the dryer and discharged from the dryer by an unloading auger.

The various prior art grain dryers include electrical and burner control panels for regulating the heated air temperature, fuel flow and safety controls for automatically shutting down the dryer in case of a power failure, loss of fuel supply, or a mechanical failure.

Heretofore, the electrical and burner control panels have not included any alarm device for indicating to the grain dryer operator that the burner is no longer operating, and, therefore, the grain being circulated past the hot air chamber is no longer being dried.

The prior art grain dryer control panels have included dial thermometers for regulating the heated air temperature, but there has been no alarm device for indicating a fire inside the dryer at its inception. Therefore, the grain may become burned and fed into the dry storage bin without the dryer operator's knowledge. Also grain dryer operators often fail to regularly clear out the insides of the hot air chambers where grain particles and waste have fallen through the perforations in the chambers sides and collected therein. These grain particles and waste will catch on fire causing a potential danger to the operator and possible loss of the dryer by fire.

The subject invention solves the above mentioned problems and provides an alarm device for safely and efficiently operating a grain dryer.

SUMMARY OF THE INVENTION

The subject invention helps the grain dryer operator in safely handling the drying of grain and preventing the burning of grain prior to the grain being stored in a dry grain bin.

Through the use of the subject alarm device the grain dryer operator immediately knows when a grain dryer burner is no longer operating and therefore not drying the grain or when a fire has started inside the dryer.

The invention provides electrical circuitry wired to a remote control station removed from the grain dryer area so that the grain dryer operator no longer needs to monitor the grain dryer by remaining beside the dryer during its operation.

The subject grain dryer alarm device further provides the advantages of having both a visual and audio alarm device mounted on the grain dryer and an audio and visual alarm device mounted at a remote control station.

The grain dryer alarm device includes a burner shutdown indicator lamp attached to the dryer and electrically connected to the controls of the burners in the dryer. Smoke detectors are attached to the dryer and are connected to a conduit positioned inside the hot air chamber. Any smoke from a fire in the dryer is forced into the conduit by static pressure and through an orifice in the conduit and into the smoke detector chamber. The smoke detector is electrically connected to a smoke detector indicator lamp for indicating to the operator the presence of smoke in the dryer. An audio alarm is electrically connected to both the burner shutdown indicator lamp and the smoke detectors for sounding an alarm when the burner is no longer in operation or smoke is detected in the dryer. Also, the device includes a transmitter electrically connected to the burner shutdown indicator lamp and the smoke detectors for electrically signaling a receiver mounted in a remote control station. The receiver is electrically attached to both an audio alarm and a visual alarm in the remote control station for alerting the operator stationed there.

The advantages and objects of the invention will become evident from the following detailed description when read in conjunction with the accompanying drawings which illustrate the preferred embodiment of the invention.

BRIEF DESCRIPTION OF THE DRAWINGS

FIG. 5 is a front view and partial side view of the smoke detector conduit.

FIG. 6 is a partial side view of the smoke detector conduit, smoke detector housing, and smoke detector.

DETAILED DESCRIPTION OF THE DRAWINGS

Figure 1:
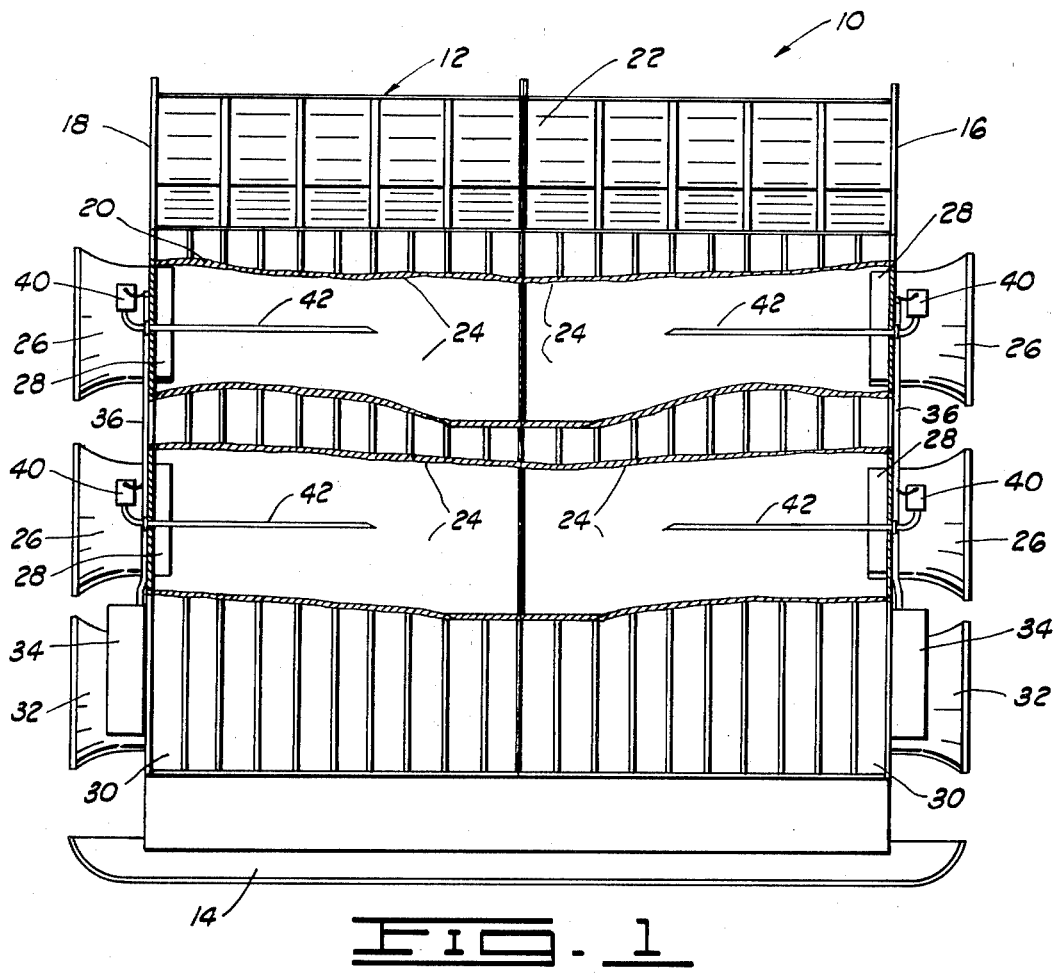
FIG. 1 is a cross section of a typical grain dryer with the smoke detectors and electrical control panel mounted thereon.

In FIG. 1 a side view of a typical grain dryer is designated by general reference numeral 10. The dryer 10 includes a housing 12. The housing 12 is mounted on a frame 14 and includes a front portion 16, a rear portion 18, and a side portion 20. On top of the housing 12 is mounted a wet grain holding bin 22 for receiving grain therein prior to drying the grain in the dryer 10. A portion of the side 20 of the housing 12 is cut away to expose four separate hot air chambers 24. Heat fans 26 are mounted on the front 16 and rear 18 of the housing 12 and adjacent the ends of the hot air chambers 24. Inside the hot air chambers 24 and adjacent the heat fans 26 are gas fired burners 28. The heat fans 26 draw outside air therein and past the burners 28 which heat the incoming air.

While not shown in this drawing the sides and top of the hot air chambers 24 include perforations therein for discharging the hot air from the hot air chambers 24. The perforations are smaller than the grain size to prevent the grain from falling into the hot air chambers 24, but grain particles and waste material often do fall into the hot air chambers which is the common cause of fires in the dryer 10.

The wet grain stored in the holding bin 22 is fed downward over the top and along both sides of the dryer 10 and adjacent the perforated sides of the hot air chambers 24. As the grain is fed downward the hot air passes through the perforated sides and through the grain thereby drying the grain. The side 20 of the housing 12 also includes a series of apertures therein for discharging the heated air when it has passed through the grain.

Positioned below the hot air chambers 24 are cool air chambers 30, which are substantially the same as the hot air chambers 24 but include cooling fans 32 without the burners 28. Air is drawn from the outside through the cooling fans 32 and discharged out the sides of the cool air chambers 30 and through the dried grain as it is received from the sides of the hot air chambers 24. The grain is cooled and then received into the bottom of the grain dryer 10. The grain is then fed out of the dryer 10 by a discharge auger into a dry storage bin. The discharge auger is not shown in the drawings.

Mounted on the front 16 and the rear 18 of the dryer 10 are electrical and burner control panels 34. The panels 34 include a burner shutdown indicator lamp which is mounted therein and not shown in the drawings. The burner indicator lamp is electrically connected to the burners 28 via an electrical conduit 36. When the burner 28 or the burner's pilot light has gone out, the burner indicator lamp in the panel 34 visually signals the dryer operator that the burner 28 is no longer in operating condition. Also mounted in the panel 34 are smoke detector lamps which are electrically connected to smoke detectors 40 via the electrical conduit 36.

The smoke detectors 40 are mounted on the front portion 16 and rear portion 18 of the housing 12 and adjacent the ends of the hot air chambers 24. The smoke detectors 40 include a conduit 42 which is inserted inside the hot air chambers 24. When smoke is present inside the hot air chambers 24 the smoke passes into the conduit 42 and past the smoke detector 40 which electrically signals the smoke detector lamps in the panel 34 alerting the grain dryer operator that smoke is present in one of the hot air chambers 24. The conduit 42 may be made having various lengths and dimensions. In practice a one inch conduit has been found acceptable and is positioned toward the rear of the hot air chamber 24. It has been found that smoke and a potential fire occur first toward the rear of the hot air chambers and away from the burner 28 and heat fan 26. Therefore, the conduit 42 is extended toward the rear of the hot air chambers 24 to detect the smoke at its inception. The housing surrounding the smoke detector 40 is vented so that static pressure draws the smoke through the conduit 42 and past the smoke detector 40. An orifice is mounted in the conduit 42 for reducing the amount of air passing through the conduit 42 thereby protecting the sensitive detector 40 from excessive air flow.

Figure 2:
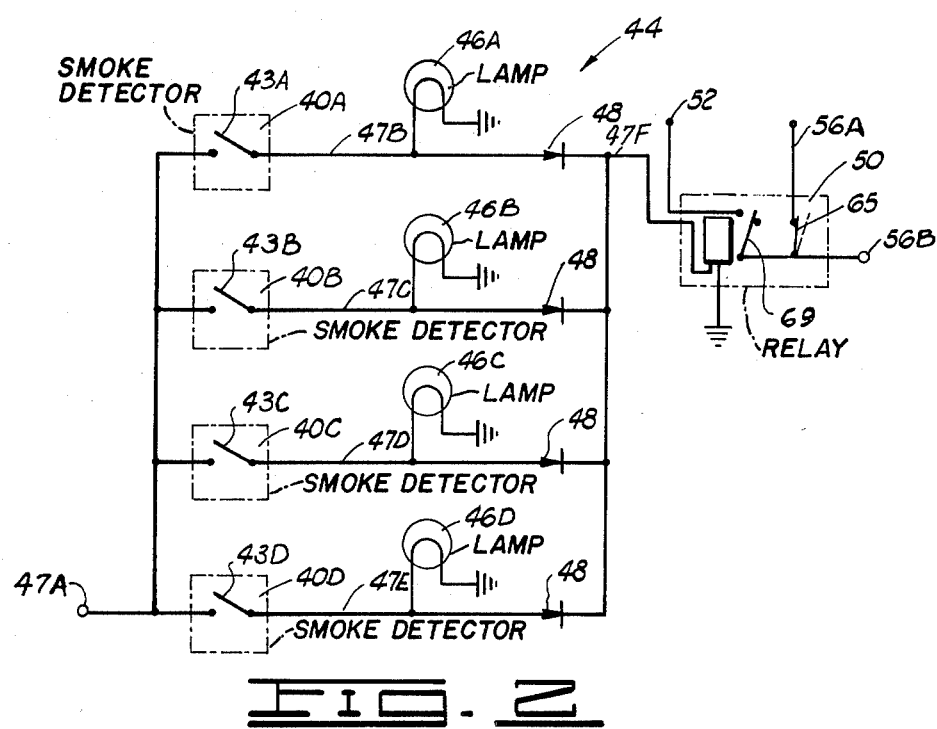
FIG. 2 is a circuit diagram of the smoke detectors wired to smoke detector indicator lamps in parallel.

In FIG. 2 a smoke detector electrical circuit 44 is shown with smoke detectors 40A, 40B, 40C, and 40D electrically wired in parellel to smoke detector indicator lamps 46A, 46B, 46C, and 46D respectively, which are mounted in the electrical and burner control panels 34. The electrical circuit 44 is powered by a battery attached to a conductor 47A. The battery may be a 6 volt battery or any other acceptable power source. The battery is not shown in the drawings. When smoke is detected, contacts 43A, 43B, 43C, and 43D of the smoke detectors 40A, 40B, 40C, and 40D close thereby energizing the indicator lamps 46A, 46B, 46C, and 46D and signaling that smoke is detected in the hot air chambers 24. Diodes 48A, 48B, 48C, and 48D which are wired to conductors 47B, 47C, 47D, and 47E and between the lamps 46A, 46B, 46C, and 46D are used to prevent feedback to the adjacent lamps. The feedback would incorrectly indicate more than one fire in the hot air chambers 24. The conductor 47F is connected to a relay 50, which is activated when one of the contacts 43 in the smoke detectors 40 close. The relay 50 is connected to a 115 volt power by a conductor 52 and is used to energize a portion of the electrical circuit discussed under FIG. 3.

Figure 3:
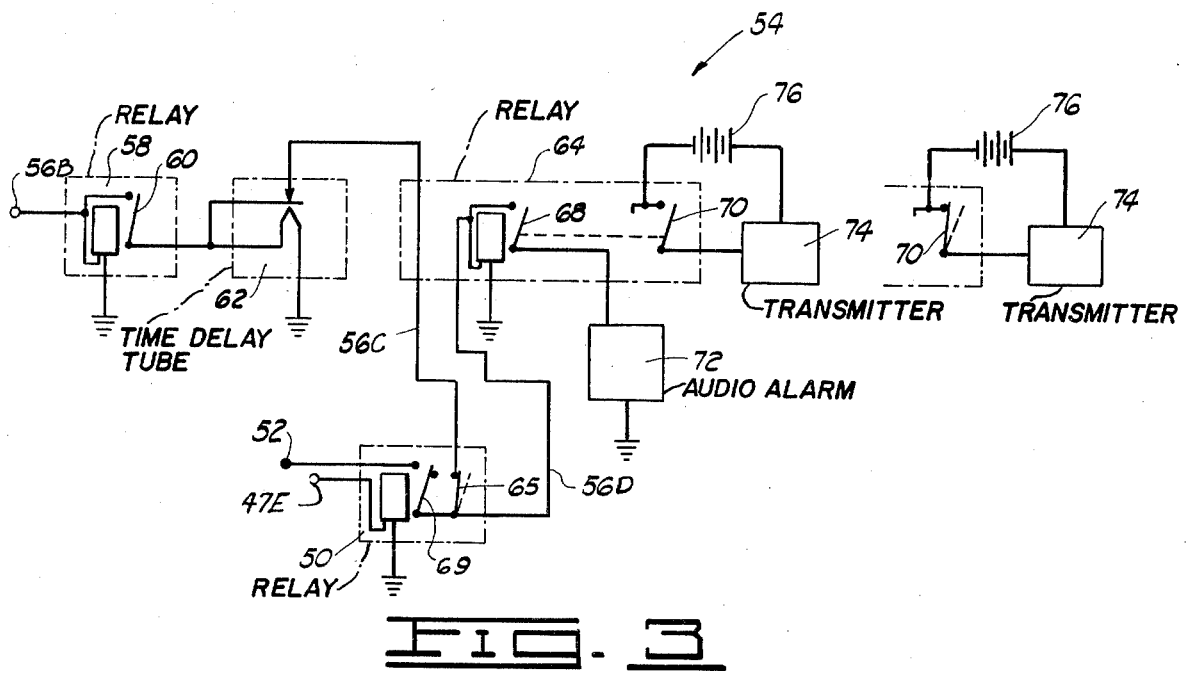
FIG. 3 is a circuit diagram of the transmitter and audio alarm electrically wired to the burner shutdown indicator lamp and smoke detectors.

In FIG. 3 a transmitter electrical circuit 54 is shown. One end of a conductor 56B is attached to the burner shutdown indicator lamp mounted in the panel 34 and wired to a 115 volt power source. When the burner shutdown indicator lamp is turned on due to a failure of the burner or the burner's pilot light going out, a relay 58 connected to conductor 56B is energized and contact 60 of the relay 58 is closed activating a time delay tube 62. The tube 62 has a valve of 115C 2. The time delay tube 62 allows a relay 64 to be activated through the normally closed contacts 65 of the relay 50. The activated relay 64 allows contacts 68 and 70 of the relay 64 to close. The closing of contact 68 sounds an audio alarm 72 which may be horn, siren, or any other audio alarm device. When contact 70 closes a transmitter 74 is energized. The transmitter 74 uses a laser beam, wire, or radio frequency for transmitting a signal to a receiver 77 shown in FIG. 4.

When the tube 62 times out, for example after a two second period, the contacts 68 and 70 of the relay 64 open deactivating the audio alarm 72 and transmitter 74.

Similarly when the smoke detector circuit 44 discussed under FIG. 2 activates the relay 50 the contact 69 closes thereby activating the relay 64 and energizing the audio alarm 72 and transmitter 74. The relay 64 remains latched until the smoke clears the detectors 40 and the battery or power supply connected to conductor 47 is disconnected so that the relay 64 may be reset. At this time contact 65 of relay 50 opens to a position shown in dotted lines to prevent feedback through the filament of tube 62.

It should be noted that the transmitter 74 is wired with a separate power source 76 which may be a 6 volt battery or any other similar power source. The transmitter 74 may be wired with the contact 70 in a closed position thereby providing a continuous signal to the receiver 77.

Figure 4:
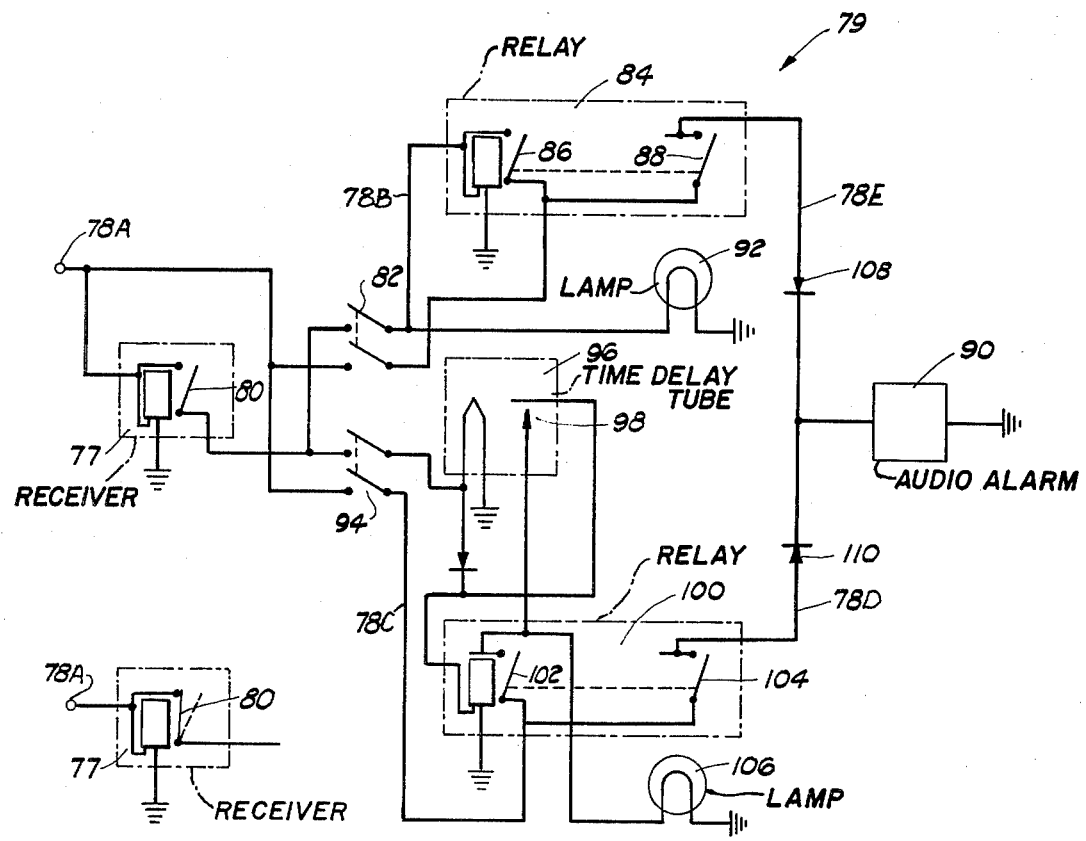
FIG. 4 is a circuit diagram of the receiver electrically wired to an audio alarm and visual alarm.

In FIG. 4 the wiring of a receiver circuit 79 is shown with the receiver 77 wired to a conductor 78A connected to a 6 volt battery source. The receiver 77 is shown with contact 80 in an open position. In operation a burner reset switch 82 is closed. When a signal is received from the transmitter 74 that a burner is no longer in operation, the contact 80 closes activating a relay 84. Contacts 86 and 88 of the relay 84 close thereby sounding an audio alarm 90. Also when the contact 80 of the receiver 77 closes, a burner indicator lamp 92 provides a visual alarm alerting the operator. When the receiver circuit 79 is in operation a fire reset switch 94 is also closed, but a time delayed tube 96 having a valve of 6 NO 5 will not close when a signal from a burner failure is transmitted since the signal will last for only two seconds as provided by the time delay tube 64 in the circuit 54 described under FIG. 3. To close the time delay tube 96 a full five seconds is needed to close a contact 98.

When smoke is detected by the smoke detectors 40 and a signal is received from the transmitter 74 the procedure is substantially the same as described above for a burner failure except the signal is constant. Therefore the contact 80 of the trasmitter 76 closes thereby energizing the time delay tube 96 and closing the contact 98. At this point a relay 100 is energized closing contacts 102 and 104 of the relay 100. Contact 104 when closed activates the audio alarm 90 sounding an alarm. When the contact 102 closes a visual alarm 106 alerts the dryer operator that smoke is detected in the dryer 10. A diode 108 is wired between the alarm 90 and relay 84 and a diode 110 is wired between the alarm 90 and relay 100 to prevent feedback when the relays energize the alarm 90.

Also shown in FIG. 4 is the receiver 77 with contact 80 closed. This arrangement would be used for receiving a continuous signal from the transmitter 74.

The electrical components shown in FIGS. 2, 3, and 4 have been tried and work satisfactorily in the circuits as described. But obviously other electrical components and values may be used that would work equally as well.

Because of the importance of the detailed structure of the elongated conduit 42 and the smoke detector 40, FIGS. 5 and 6 have been added to more clearly disclose the structure of the subject invention.

In FIG. 5, a front view of the conduit 42 and a partial side view of the conduit 42 is illustrated. The conduit 42 includes a first end portion 112, an elongated center portion 114, and a second end portion 116, shown in FIG. 6, which extends through an opening 118 in the front portion 16 of the grain dryer housing 12. The conduit 42 is made of one inch pipe. While this size pipe has been successfully used, it can be appreciated that various size pipes may be used depending on the volume of air flow used in drying the grain in the housing 12. An opening 122 in the end portion 112 of the conduit 42 has downwardly sloping sides 120. The opening 122 in the end portion 112 of the conduit 42 is covered with a screen 124. The screen is used to filter contaminants which are continuously circulated in the dryer due to the large air flow through the hot air chambers 24. The conduit 42 is positioned with the opening 122 facing downwardly so that the turbulant air in the chambers 24 acts to self-clean the screen 124. The screen is of 40 to 50 mesh. The screen 124 prevents the contaminants from entering into the inside of the conduit 42 and plugging it or from contacting the sensitive smoke detector 40 and causing damage thereto. The air flow and smoke is represented by arrows 125.

In FIG. 6 the second end portion 116 of the conduit 42 can be seen extending through the opening 118 in the side portion 116 of the housing 12 and attached to a fitting 126 which houses an orifice 128 and having an aperture 130 therein. This opening acts as an expansion valve and reduces the volume of air passing through the conduit 42. It has been found without the use of the orifice 128, the large amount of air flow into the hot air chamber 24 is excessive as to the sensitive controls of the smoke detector 40 and will often break the smoke detector 40 or cause it to malfunction. By using the orifice 128, the air flow is restricted and the correct amount of air flow is received. The conduit 42 further includes a 90° elbow 132 communicably connected to the second end portion 116 by the fitting 126 and attached to the bottom of a smoke detector housing 134 by a connector 136. By mounting the orifice 128 outside of the dryer housing 12, lag time is reduced in gathering the smoke into the conduit 42. The orifice 128 is not mounted on the housing 134 because of the cooling effect the orifice 128 has on the air going into the housing 134.

The smoke detector housing 134 includes a removable top 138. The removable top 138 is attached to the top of the smoke detector 40 by a thread bolt and nut 140. The top 138 centers the smoke detector 40 in the middle of the housing 134 so that the smoke indicated by arrows 125 can be received through the elbow 132 into the bottom of the housing 134 and around all of the sides of the smoke detector 40. The top 138 also allows easy access to the housing 134 for inspecting the detector 40. The housing 134 further includes vent holes 142 around the top of sides 144 of the housing 134.

In operation during the drying of the grain in the housing 12, should smoke and a potential fire begin in the rear of the hot air chamber 24, the smoke represented by the arrows 125 pass through the screen 124 along the length of the conduit 42 and through the aperture 130 in the orifice 128. The smoke 142 then is received in the bottom of the housing 134 where it passes around the smoke detector 40 and activating the detector 40. The smoke is then vented out the holes 142 in the sides of the housing 134.

It should be noted that photoelectric smoke detectors have been used in the subject invention rather than ion smoke detectors. The grain dryer 10 is gas or oil operated and the ion detector is activated from gas exhaust fumes in the air. The photoelectric smoke detector is not activated by any gas exhaust fumes and is not activated until it senses smoke originating from heated grain particles and waste material in the hot air chambers 24. There are grain dryers that are steam operated and in this case there are no gas exhaust fumes and an ion smoke detector could be used.

While the subject invention has been discussed in connection with a grain dryer, it should be appreciated that the alarm device could be used equally well in other applications and in particular, grain elevators which are susceptible to serious explosions caused by dust and fire. The alarm device in this case would detect smoke caused by slippage of elevator belts used for raising the grain to the top of the elevator. The slippage will normally give off detectable smoke before the flash point of the dust is reached, therefore, the subject invention would detect a problem in the elevator prior to a potential explosion.

Changes may be made in the construction and arrangement of the parts or elements of the embodiment as disclosed herein without departing from the spirit or scope of the invention as defined in the following claims.

I claim:

1. A grain dryer alarm device attached to a housing of a grain dryer, the alarm device comprising:
    a smoke detector housing disposed outside the dryer housing;
    a smoke detector mounted inside said detector housing;
    an elongated conduit having one end communicably connected to said smoke detector housing, said conduit attached to and extending through the dryer housing, the other end of said conduit disposed inside a hot air chamber of the dryer, said conduit receiving smoke therein and conducting the smoke to said smoke detector housing and said smoke detector when smoke occurs in the hot air chamber;
    dryer signal means attached to the dryer and electrically connected to said smoke detector for signaling when smoke is detected in the dryer.

2. The alarm device as described in claim 1 further including a screen mounted over the end of said conduit inside the hot air chamber of the dryer, said screen preventing contaminants in the air from entering inside said conduit.

3. The device as described in claim 1 further including an orifice disposed in the end of said elongated conduit connected to said smoke detector housing, said orifice having an opening therein less than the inside diameter of said conduit for restricting the air flow through said conduit prior to entering said smoke detector housing.

4. The alarm device as described in claim 1 wherein said device further includes a burner shutdown indicator means attached to the dryer and electrically connected to the controls of a burner in the dryer for signaling when the burner is no longer operating.

5. The alarm device as described in claim 4 further including:
    a transmitter electrically connected to said dryer signal means and said burner shutdown indicator means for receiving an electrical signal therefrom;
    a receiver positioned in a remote control station for electrically receiving a signal from said transmitter; and
    receiver signal means electrically connected to said receiver for signaling in the control station when the burner is no longer operating or smoke is detected in the dryer.

6. The alarm device as described in claim 1 wherein said dryer signal means includes a smoke indicator lamp and audio alarm electrically connected to said smoke detector for indicating when smoke is in the dryer.

7. A grain dryer alarm device attached to a housing of a grain dryer, the alarm device comprising:
    a burner shutdown indicator lamp attached to the dryer housing and electrically connected to the controls of a burner in the dryer for electrically signaling when the burner is no longer operating;
    a smoke detector housing disposed outside the dryer housing;
    a smoke detector mounted inside said detector housing;
    an elongated conduit having one end communicably connected to said smoke detector housing, said conduit attached to and extending through the grain dryer housing, the other end of said conduit disposed inside a hot air chamber of the dryer with a screen disposed around the opening in the end of said conduit, said conduit receiving smoke therein and conducting the smoke to said smoke detector disposed inside said smoke detector housing when smoke occurs in the hot air chamber;
    an orifice disposed inside the end of said conduit connected to said smoke detector housing, said orifice having an opening smaller than the inside diameter of said conduit for restricting the flow of the air in the conduit prior to entering the smoke detector housing;
    a smoke detector indicator lamp attached to the dryer housing and electrically connected to said smoke detector for visually signaling when smoke is detected in the dryer; and
    a dryer audio alarm attached to the dryer housing and electrically connected to said burner shutdown indicator lamp and said smoke detector for sounding an audio alarm when the burner is no longer operating and smoke is detected in the dryer.

8. The alarm device as described in claim 7 further including:
    a transmitter attached to the dryer housing and electrically connected to said burner shutdown indicator lamp and said smoke detector for receiving an electrical signal therefrom when the burner is no longer in operation or smoke is detected in the dryer;
    a receiver positioned at a remote control station for electrically receiving the signal from said transmitter;
    a receiver audio alarm electrically connected to said receiver for sounding an audio alarm at the remote control station; and
    a receiver visual alarm electrically connected to said receiver for visually signaling an alarm at the remote control station.

9. The alarm device as described in claim 7 wherein said smoke detector is a photoelectric smoke detector used when the grain dryer is heated by gas or oil.

* * * * *